United States Patent
Joshi et al.

(10) Patent No.: US 9,218,381 B2
(45) Date of Patent: Dec. 22, 2015

(54) METHOD AND APPARATUS FOR PORTABLE INDEX ON A REMOVABLE STORAGE MEDIUM

(75) Inventors: Bhuvnesh Joshi, Bangalore (IN); Harsha Ramamurthy Joshi, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 435 days.

(21) Appl. No.: 13/638,809

(22) PCT Filed: Mar. 4, 2011

(86) PCT No.: PCT/FI2011/050189
§ 371 (c)(1),
(2), (4) Date: Apr. 16, 2014

(87) PCT Pub. No.: WO2011/117465
PCT Pub. Date: Sep. 29, 2011

(65) Prior Publication Data
US 2014/0222824 A1    Aug. 7, 2014

(30) Foreign Application Priority Data
Mar. 26, 2010    (IN) .............................. 830/CHE/2010

(51) Int. Cl.
G06F 17/20    (2006.01)
G06F 17/30    (2006.01)

(52) U.S. Cl.
CPC .... G06F 17/30321 (2013.01); G06F 17/30091 (2013.01)

(58) Field of Classification Search
CPC .......................... G06F 17/301; G06F 17/3012
See application file for complete search history.

(56) References Cited

U.S. PATENT DOCUMENTS

| | | | | |
|---|---|---|---|---|
| 7,783,615 | B1 * | 8/2010 | Compton et al. | 707/694 |
| 2005/0289193 | A1 * | 12/2005 | Arrouye et al. | 707/200 |
| 2011/0106815 | A1 * | 5/2011 | Dubs et al. | 707/747 |
| 2011/0238906 | A1 * | 9/2011 | Amir et al. | 711/111 |

FOREIGN PATENT DOCUMENTS

| | | |
|---|---|---|
| CN | 1661573 A | 8/2005 |
| CN | 1890743 A | 1/2007 |

OTHER PUBLICATIONS

Chinese Office Action corresponding to Chinese Patent Application No. 201180025632.8 dated Feb. 17, 2015, with English-language summary; 6 pages.
Office Action for corresponding Chinese Patent Application No. 201180025632.8, dated Aug. 6, 2015, with English Language Summary, 4 Pages.
Office Action for corresponding Indian Patent Application No. 830/CHE/2010, dated Oct. 23, 2015, 2 Pages.

* cited by examiner

*Primary Examiner* — Khanh Pham
(74) *Attorney, Agent, or Firm* — Ditthavong & Steiner, P.C.

(57) ABSTRACT

Techniques for supporting a portable index include, in response to determining that a removable computer-readable storage medium is recently mounted on a particular drive having a particular drive identifier, determining a particular media identifier for the removable computer readable storage medium. Before harvesting metadata from each file of a set of one or more files on the removable computer-readable storage medium, it is determined whether a portable index file is stored on the removable computer-readable storage medium. The portable index file includes, for each file of the set, data that associates the media identifier (312) and a relative directory path (314) for one file of the set with metadata (316) for the one file. If the portable index file is stored, then an index is caused to be retrieved from the portable index file without harvesting metadata from each file of the set.

13 Claims, 9 Drawing Sheets

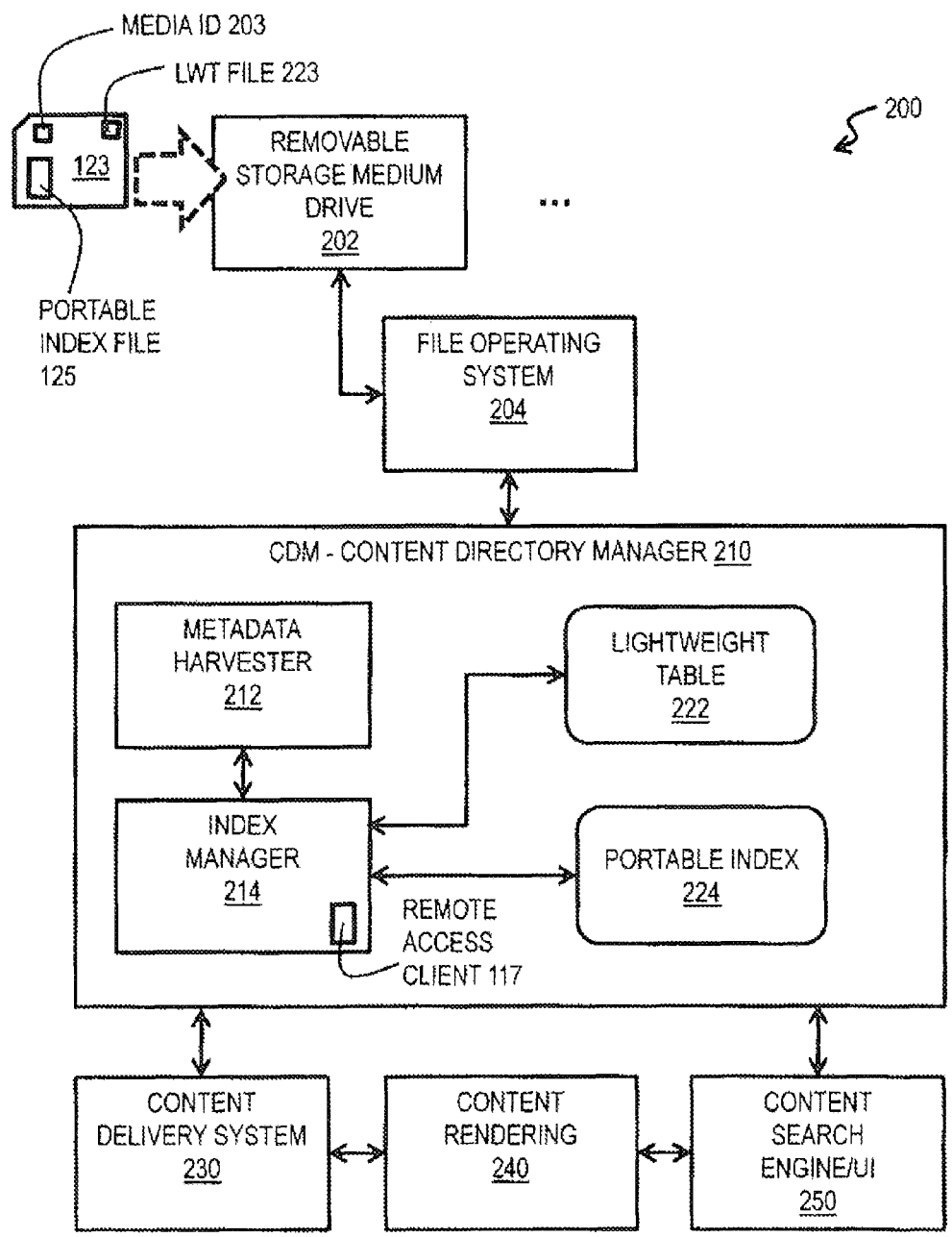

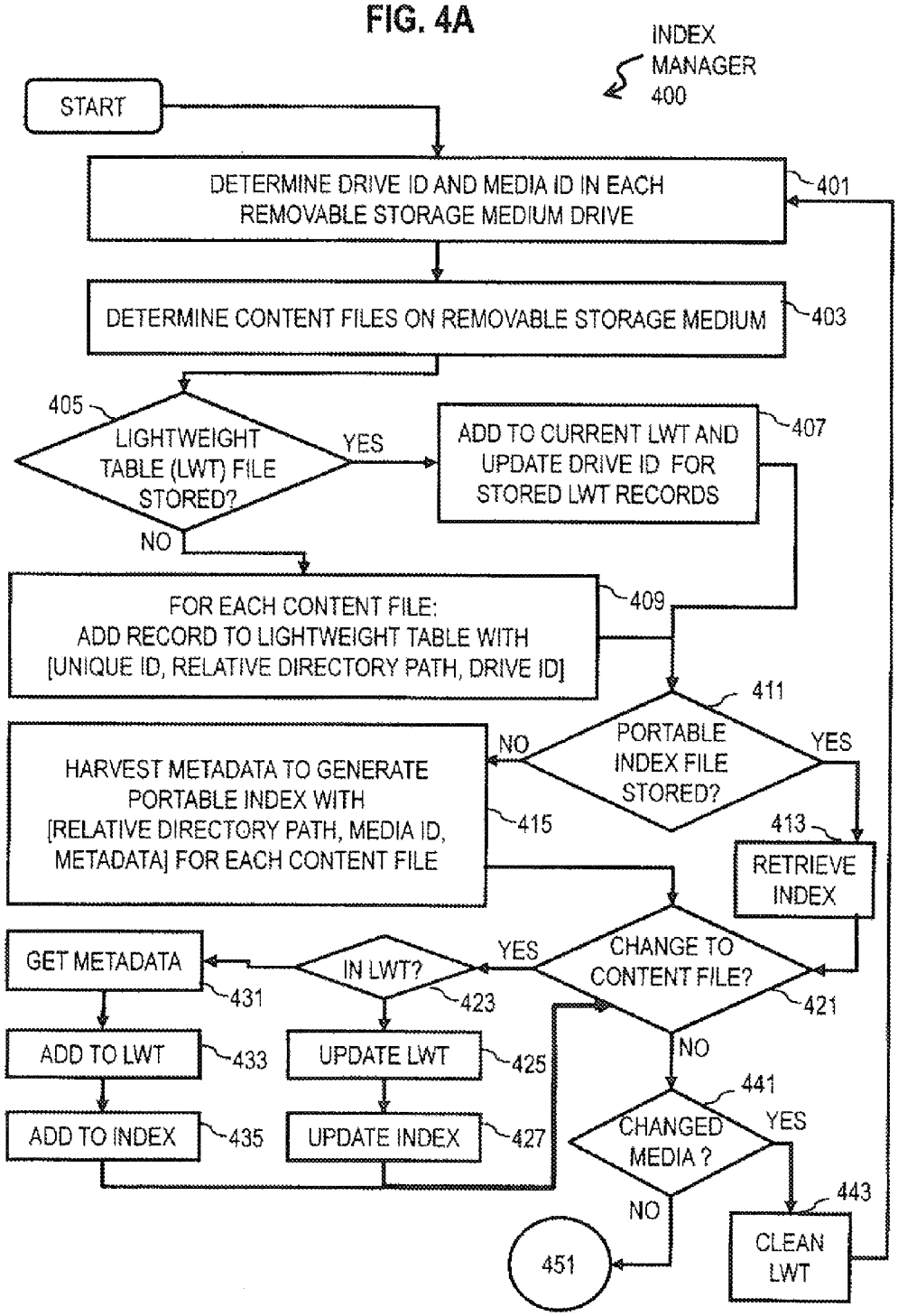

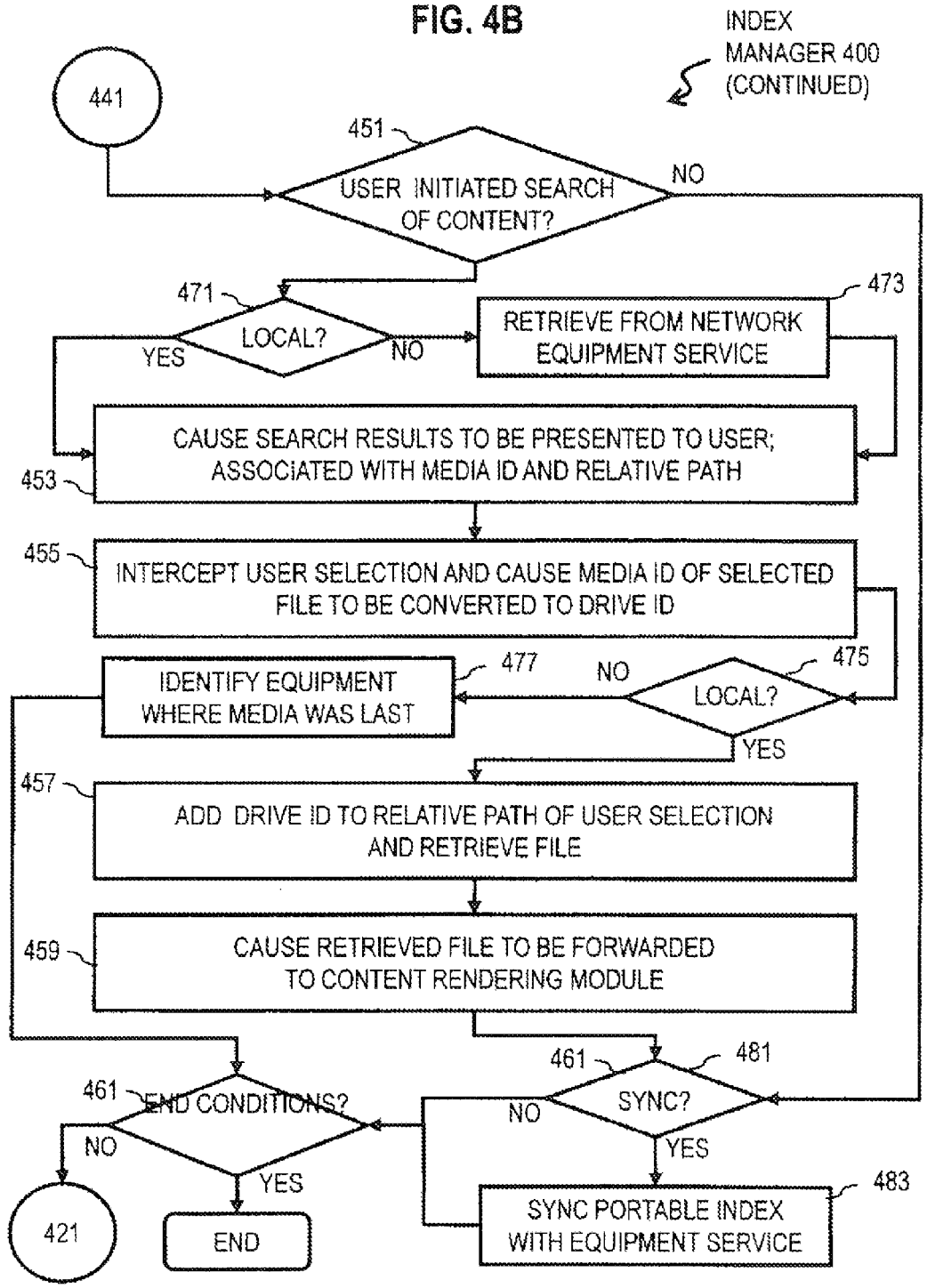

METHOD AND APPARATUS FOR PORTABLE INDEX ON A REMOVABLE STORAGE MEDIUM

RELATED APPLICATION

This application was originally filed as PCT Application No. PCT/FI2011/050189 filed Mar. 4, 2011, which claims priority benefit to Indian Patent Application No. 830/CHE/2010 filed Mar. 26, 2010.

BACKGROUND

Service providers and device manufacturers (e.g., wireless, cellular, etc.) are continually challenged to deliver value and convenience to consumers by, for example, providing compelling network services. Often the services include delivering content, such as music data, to a consumer's equipment for rendering on that equipment. A consumer often chooses to store the delivered content as files on one or more computer-readable storage medium, including in some instances one or more removable computer-readable storage medium (such as a mobile memory card, MMC). With multiple such content files on the storage device, a consumer uses an index to quickly identify particular content for rendering based on metadata about the content, such as song title or artist name.

However, when a removable storage medium is moved to different equipment, such as equipment of a friend of the consumer, or new equipment of the consumer, the index generally is not useable. The index points to files with absolute directory paths on the prior equipment that may not be valid on the different equipment. Consequently, the different equipment has to execute a process to generate the index anew from the content files found on the removable storage medium. Generating an index from stored content can expend considerable computational, memory, bandwidth, and battery resources on the different equipment and delay the availability of the content. Often, the delay is a noticeably long time, such as a delay in a range from tens of minutes to over an hour, depending on the size of the files, the equipment properties, and the number of applications executing simultaneously on the equipment.

Some Example Embodiments

Therefore, there is a need for techniques that support a portable index on a removable computer-readable storage medium.

According to one embodiment, a method comprises, in response to determining that a removable computer-readable storage medium is recently mounted on a particular drive having a particular drive identifier, determining a particular media identifier for the removable computer-readable storage medium. The method also comprises, before harvesting metadata from each file of a set of one or more files on the removable computer-readable storage medium, determining whether a portable index file is stored on the removable computer-readable storage medium. The portable index file includes, for each file of the set, data that associates the media identifier and a relative directory path for one file of the set with metadata for the one file. The method further comprises, if the portable index file is stored, then causing an index to be retrieved from the portable index file without harvesting metadata from each file of the set.

According to another embodiment, an apparatus comprises at least one processor, and at least one memory including computer program code, the at least one memory and the computer program code configured to, with the at least one processor, cause, at least in part, the apparatus to, in response to determining that a removable computer-readable storage medium is recently mounted on a particular drive having a particular drive identifier, determine a particular media identifier for the removable computer-readable storage medium. The apparatus is also caused to, before harvesting metadata from each file of a set of one or more files on the removable computer-readable storage medium, determine whether a portable index file is stored on the removable computer-readable storage medium. The portable index file includes, for each file of the set, data that associates the media identifier and a relative directory path for one file of the set with metadata for the one file. The apparatus is further caused to cause an index to be retrieved from the portable index file without harvesting metadata from each file of the set, if the portable index file is stored.

According to another embodiment, a computer-readable storage medium carries one or more sequences of one or more instructions which, when executed by one or more processors, cause, at least in part, an apparatus to, in response to determining that a removable computer-readable storage medium is recently mounted on a particular drive having a particular drive identifier, determine a particular media identifier for the removable computer-readable storage medium. The apparatus is also caused to, before harvesting metadata from each file of a set of one or more files on the removable computer-readable storage medium, determine whether a portable index file is stored on the removable computer-readable storage medium, wherein the portable index file includes, for each file of the set, data that associates the media identifier and a relative directory path for one file of the set with metadata for the one file. The apparatus is further caused to cause an index to be retrieved from the portable index file without harvesting metadata from each file of the set, if the portable index file is stored.

According to another embodiment, an apparatus comprises means for, in response to determining that a removable computer-readable storage medium is recently mounted on a particular drive having a particular drive identifier, determining a particular media identifier for the removable computer-readable storage medium. The apparatus also comprises means for before harvesting metadata from each file of a set of one or more files on the removable computer-readable storage medium, determining whether a portable index file is stored on the removable computer-readable storage medium. The portable index file includes, for each file of the set, data that associates the media identifier and a relative directory path for one file of the set with metadata for the one file. The apparatus further comprises means for causing an index to be retrieved from the portable index file without harvesting metadata from each file of the set if the portable index file is stored.

According to another embodiment, a computer-readable storage medium carries a set of one or more files of content and a data structure configured for an apparatus to provide a portable index. The data structure comprises, for each file of the set, data that indicates a media identifier for the computer-readable storage medium, a relative directory path for the file, and corresponding metadata for the file.

According to another embodiment, a computer-readable storage medium carries a set of one or more files of content and a data structure configured for an apparatus to provide a portable index. The data structure comprises, for each file of the set, data that indicates a particular drive identifier for a particular drive on which the computer-readable storage medium is most recently mounted, a relative directory path for one file of the set, and a corresponding unique content identifier for the file.

For various example embodiments of the invention, the following is applicable:

A method comprising:
facilitating a processing of and/or processing: (1) data and/or (2) information and/or (3) at least one signal;
the (1) data and/or (2) information and/or (3) at least one signal based at least in part on (or derived at least in part from) any one or any combination of methods (or processes) disclosed in this application as relevant to any embodiment of the invention.

For various example embodiments of the invention, the following is applicable:

A method comprising facilitating access to at least one interface configured to allow access to at least one service, the at least one service configured to perform any one or any combination of network or service provider methods (or processes) disclosed in this application.

For various example embodiments of the invention, the following is applicable:

A method comprising facilitating creating and/or facilitating modifying: (1) at least one device user interface element and/or (2) at least one device user interface functionality;
the (1) at least one device user interface element and/or (2) at least one device user interface functionality based at least in part on the following:
data and/or information resulting from one or any combination of methods or processes disclosed in this application as relevant to any embodiment of the invention and/or
at least one signal resulting from one or any combination of methods (or processes) disclosed in this application as relevant to any embodiment of the invention.

For various example embodiments of the invention, the following is applicable:

A method comprising creating and/or modifying: (1) at least one device user interface element and/or (2) at least one device user interface functionality;
the (1) at least one device user interface element and/or (2) at least one device user interface functionality based at least in part on the following:
data and/or information resulting from one or any combination of methods (or processes) disclosed in this application as relevant to any embodiment of the invention and/or
at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of the components of user equipment supporting a portable index on a removable storage medium, according to one embodiment;

FIG. 4A-4B are diagrams of a flowchart of a process for supporting a portable index on a removable storage medium, according to one embodiment;

DESCRIPTION OF SOME EMBODIMENTS

Figure 1:
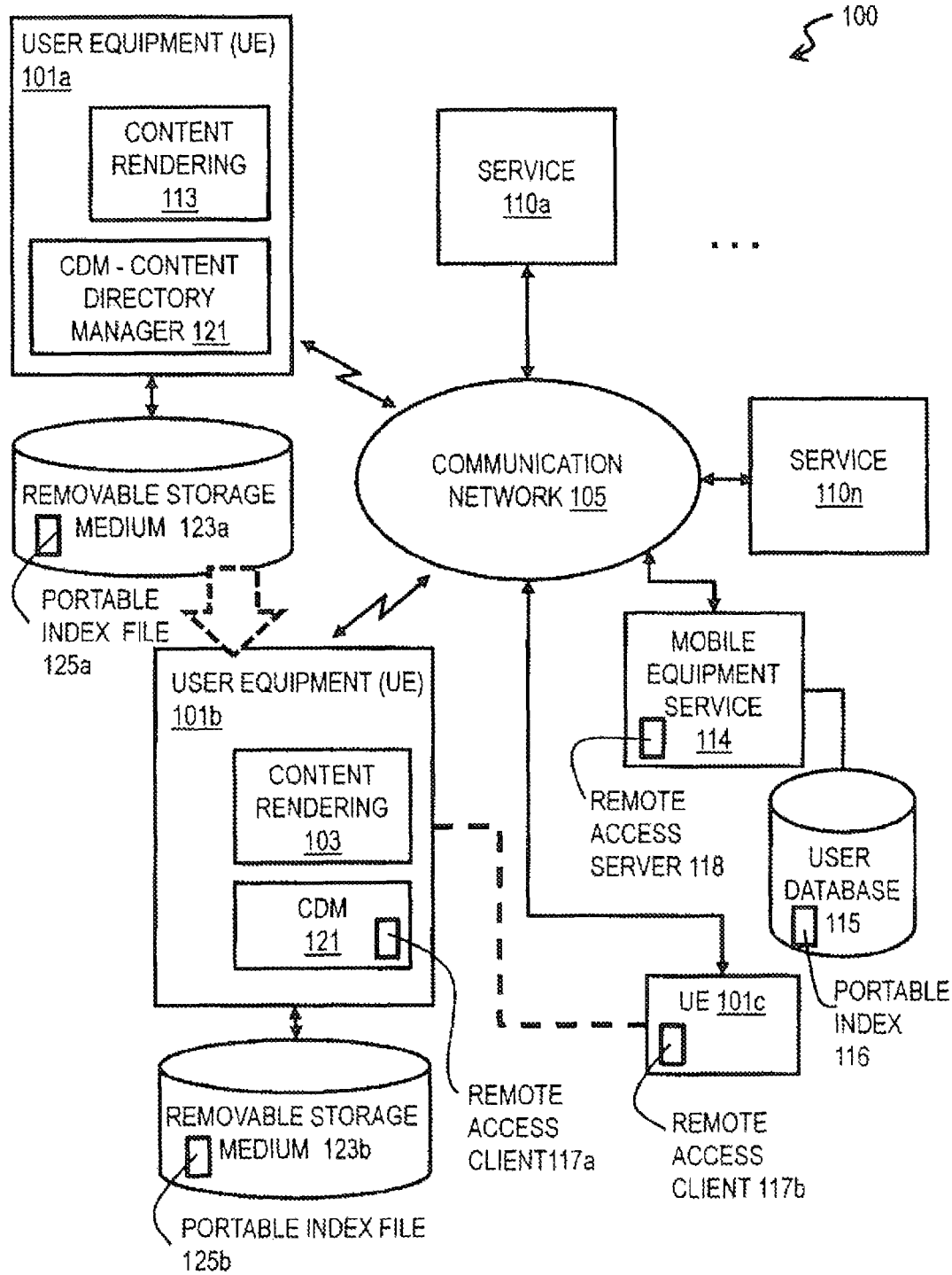
FIG. 1 is a diagram of a system capable of supporting a portable index on a removable storage medium, according to one embodiment.

Examples of a method, apparatus, and computer program for a portable index on a removable storage medium are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term file refers to any digital data stored on a computer-readable storage medium which is separately addressable by an operating system for a processor controlled device, such as a computer or mobile terminal. Operating systems are instructions resident on a device for providing basic functions on the device. Processors and computer-readable medium and instructions are defined in more detail below with reference to FIG. 6, FIG. 7 and FIG. 8. Files are typically grouped by file operating systems into a named directory, and different named directories are often grouped into other named directories at a higher level of a hierarchy of directories that extend like branches from a root directory, as is well known in the art. The root directory is often associated with a particular computer-readable storage medium. As used herein a drive refers to a device that reads data from and, in some embodiments, writes data to a computer-readable storage medium. An operating system refers to a drive by a drive identifier, typically a drive letter, such as "A:," "B:". As used herein, a directory path refers to data that indicates the location of a file by identifying the sequence of named directories in the hierarchy of named directories to be traversed to reach the file, as is well known in the art, e.g., with different symbols representing a transition upward or downward in the hierarchy between named directories. A relative directory path indicates the directory path from a starting directory, usually from the root directory. An absolute directory path comprises the drive letter and the relative directory path from the root directory.

As used herein, the term content refers to any digital data that can be presented for human perception, for example, digital sound, songs, digital images, digital games, digital maps, point of interest information, digital videos (such as music videos, news clips and theatrical videos), documents, advertisements, program instructions or data objects, any other digital data, or any combination thereof. The term rendering indicates any method for presenting the content to a human user, including playing music through speakers, displaying images or text on a screen or in a projection or on tangible media such as photographic or plain paper, showing videos on a suitable display device with sound, graphing game or map data, music or video playback or streaming, games playing, image or map displaying, radio or television content broadcasting or streaming, or any other term of art for presentation, or any combination thereof. Content is often stored in one or more files.

Although various embodiments are described with respect to files of music content on mobile memory cards (MMCs) for mobile terminals, such as cellular telephones; it is contemplated that the approach described herein may be used with files of the same or other content on the same or other removable storage media on the same or other devices.

FIG. 1 is a diagram of a system capable of supporting a portable index on a removable storage medium, according to one embodiment. Because storage is currently inexpensive, it is very common for users to store large amounts of personal data like songs, video, documents, images and other content in their hand held devices. This in turn leads to a strong need for a highly efficient search solution, for managing large amounts of data. There are multiple search solutions available for mobile and desktop environments, many of which harvest metadata for each content file and accumulate that metadata in association with the file in an index that can be searched. One of the biggest challenges, however, is maintaining the index data in a format such that it is portable. When the medium is moved across environments, e.g., to a different drive or rendering device, it is desirable that the move have little or no impact on the indexes for the medium. Otherwise, the device receiving the removable storage medium must form a new index, which involves opening each file, harvesting metadata from the contents of the file, and writing a new index into storage or memory. This process can take tens of minutes to over an hour, and expend considerable storage, processor, memory and battery resources on the receiving device, and delay accessibility of the content on the receiving device.

Many search solutions indicate an absolute address in the index they form, which includes a drive ID for the drive on which the removable storage medium is mounted (e.g., drive "G"). When this index is moved with the content files to different equipment, the drive ID for the drive on which the storage medium is mounted is likely to be different (e.g., drive "E"). This renders the index invalid for the different equipment, and forces the different equipment to reopen each content file and harvest the metadata therein again, and rebuild an index file, a process called re-indexing herein. As stated above, re-indexing is expensive of processor, memory, battery and bus resources that are often scarce on hand held devices like cellular telephones. Furthermore search of the storage medium is delayed substantially until the new index is ready. However, many changes made to the index to allow for portability may require substantial changes to a search engine. Therefore it is desirable to change the index to make it portable without requiring extensive changes to a search engine.

Thus avoiding re-indexing of the content not only saves storage, processor, memory and battery resources, but also improves the search experience for the user. The data is available for search almost instantaneously. Furthermore, avoiding re-indexing without major changes to a search engine is desirable because such a solution is more readily adopted and saves resources involved in re-designing, re-testing and re-deploying these content search engines. To address this problem, a system 100 of FIG. 1 introduces the capability to support a portable index that can be used by a search engine on a receiving device without re-indexing. As shown in FIG. 1, the system 100 comprises user equipment (UE) 101a and UE 101b and UE101c (collectively referenced hereinafter as UE 101) having connectivity to services 110a through 110n (collectively referenced hereinafter as services 110) and mobile equipment service 114 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.). Each UE 101 includes a drive for one or more removable storage medium. For example, UE 101a and UE 101b include drives for removable storage medium 123a and removable storage medium 123b, respectively, collectively referenced hereinafter as removable storage medium 123. UE 101c is configured with an interface to removeably connect to UE 101a or UE 101b, as indicated by a dashed line to UE 101b. UE 101c is also in communication with network 105.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates.

Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages.

In the illustrated embodiment, the UE 101 communicate with one or more of services 110 to download content for rendering by content rendering process 103, and to store as files (not shown) on a removable storage medium 123, if so indicated by a user. According to some embodiments, the UE 101 include a content directory manager (CDM) 121 that causes a portable index file (such as portable index files 125a and 125b, collectively referenced hereinafter as portable index files 125, on medium 123a and 123b, respectively) to be stored on the removable storage medium 123. The CDM also causes the portable index file 125 to be used to support searches of content on the media 123 without re-indexing. In the illustrated embodiment, the CDM 121 is configured to be called by a content search engine to retrieve an index for the content search engine so that modifications to the content search engine are not required. The CDM 121 is also configured to intercept a request to a file operating system for retrieving a particular file indicated by the search engine, such as a user selection of a search result, to return a file, or a command to open a file, that properly identifies a drive on which a removable storage medium holding the file is mounted.

For example, when removable storage medium 123a is removed from a drive G on UE 101a and inserted into a drive E on UE 101b, as indicated by the dashed arrow, then the portable index file 125a is used by CDM 121 on UE 101b to support searches without re-indexing the files on medium 123, i.e., without opening each file, bringing at least a portion of the content into memory, harvesting the metadata therein, and storing the associated files and metadata in a new index in memory or in a new index file.

The mobile equipment service 114 is a network service that supports user equipment, such as user equipment purchased from the provider of mobile equipment service 114. The mobile equipment service 114 maintains a database of users and equipment in a user data structure, such as user database 115. In some embodiments, the mobile equipment service 114 includes remote access server 118 that supports remote access to the portable index of the removable storage media 123 by storing a copy of a portable index in a portable index data structure 116 in the user database 115. In such embodiments, remote access client 117a is included on UE 101 to synchronize the portable index with the user data structure, e.g., database 115. In some embodiments, remote access to the portable database is also available by virtue of the remote access client 117b on UE 101c where the removable storage medium 123 is not directly mounted. FIG. 2 is a diagram of the components 200 of user equipment supporting a portable index on a removable storage medium, according to one embodiment. By way of example, UE 101 includes one or more components for supporting a portable index on a removable storage medium. It is contemplated that the functions of these components, or portions thereof, may be combined in one or more components or performed by other components of equivalent functionality. In this embodiment, the UE 101 includes a removable storage medium drive 202, a file operating system module 204, a content directory manager (CDM) module 210, a content delivery system module 230, a content rendering module 240 and a content search and user interface (UI) module 250. The components are configured to work together to support the formation and use of a portable index file 125 on a removable storage medium 123. Each removable storage medium 123 includes data that indicates a media identifier (ID) 203 that is unique among all removable computer-readable storage media. In some embodiments, the CDM also supports a lightweight table (LWT) file 223 on the removable storage medium 123, as described in more detail below.

The removable storage medium drive 202 is configured to read data from or write data to any removable storage medium of one or more types connected thereto. The UE 101 may include one or more such drives, as indicated by the ellipsis, such as different drives for the same or different types of media, collectively referenced hereinafter as drives 202. Any removable storage medium drive known in the art may be used, including, for example, drives for mobile memory cards (MMCs) of various physical dimensions and storage capacities, flash drives, universal serial bus (USB) drives, compact disc (CDs) drives, digital video disc (DVD) drives, among others, alone or in some combination.

The file operating system module 204 is resident on the user equipment and controls the operation of the drive 202 to move data between a removable storage medium and memory on the UE 101, as described in more detail below with reference to FIG. 6 or FIG. 7 or FIG. 8. An application programming interface (API, not shown) included in the file operating system module 204 allows other processes on the UE to interact with the file operating system module 204, e.g., to determine whether a removable storage medium 123 is mounted in the drive 202 and ready for reading or writing data. Through the API, other programs on UE 101 can also determine a value of the media ID data 203 and the directory structure of files on the removable storage medium 123.

The content delivery system module 230 determines content available from services 110 through a communication network 105, determines a user's choice for obtaining that content, and whether to dispose the content to an appropriate content rendering module or to storage on the equipment, including storage on a removable storage medium in one of the drives 202. For example, in some embodiments, the content delivery system includes a web browser client process that communicates with one or more services 110 via messages sent across network 105 using the hypertext transfer protocol (HTTP), as is well known in the art.

The content rendering module 240 renders, for human perception, content received via communication network 105 or retrieved from one or more files in storage on the UE 101, such as on removable storage medium 123 in one of the drives 202. Different rendering modules are often included for different types of content, e.g., for different codes representing audio only data, or video data, or documents, or games, etc., alone or in any combination, as is well known in the art. All such content rendering modules are collectively referenced hereinafter as content rendering module 240.

The content search engine/UI module 250 allows a user to determine what content is available in the files on the user equipment, including content in any files on any removable storage medium in drives 202, and to select one for further processing, such as rendering. The content search engine uses one or more values of metadata associated with each file as maintained in an index. The engine includes a user interface (UI) that allows the user to search for content based on one or more criteria set by the user and further allows the user to make a selection from a list of one or more files with content that satisfy the criteria. In some embodiments, at least some metadata is also presented to the user for each listed file. In some embodiments, the content search engine/UI 250 is a conventional search engine configured to request an index and a file from separate modules.

The content directory manager (CDM) module 210 is an embodiment of CDM 121 that is configured to provide the index and files for the content search engine/UI 250. The CDM module 210 ensures that an index is available for each removable storage medium mounted in any of drives 202. Thus, access to the index is provided to the search engine/UI 250 by the CDM module 210; and data indicating the user selection from the list derived from the index is returned from the search engine/UI 250 to the CDM module 210. The CDM module 210 causes the content rendering module 240 to open the file with the selected content, e.g., by passing a command that opens the selected file to the content search engine/UI 250, which passes the command to the content rendering module 240.

In the illustrated embodiment, the CDM 210 includes a metadata harvester module 212, an index manager module 214 and one or more data structures for the index manager, including one or more of a portable index data structure 224 or a lightweight table (LWT) data structure 222, or both. In some embodiments, the CDM module 210 includes a remote access client 117, such as in the index manager module 214 as depicted in FIG. 2.

The metadata harvester module 212 opens a particular file according to an appropriate format for the type of content (e.g., as indicated by a filename extension) and extracts the metadata on which a search may be conducted. Typically, the extracted metadata is indicated by a pair of values, the first indicating a parameter name and the second indicating a value for the named parameter. For some content types, such as documents, the metadata name is a key word or phrase, and the value is a count or percent occurrence. Different harvester modules are often included for different types of content, e.g., for different codes representing audio only data, or video data, or documents, or games, etc., alone or in any combination, as is well known in the art. All such metadata harvester modules are collectively referenced hereinafter as metadata harvester module 212.

The index manager module 214 generates or maintains a portable index of metadata for each file on each storage medium on the user equipment. In some embodiments, the portable index for a particular medium is retained in the portable index file 125 on the removable storage medium; and in some embodiments some or all of the portable index is copied to memory into portable index data structure 224. In some embodiments, the index manager also generates or maintains a lightweight table data structure 222 that quickly points to all files on all removable storage media mounted on drives 202 in the user equipment, as described in more detail below. In some embodiments a portion of a lightweight table relevant to an individual removable storage medium is included as a lightweight table (LWT) file on the removable storage medium, e.g., LWT file 223 on removable storage medium 123. In some embodiments, the index manager 214 determines based on the LWT which files should be harvested for metadata (e.g., newly downloaded files) and which files need not be harvested (e.g., files already on the removable storage medium 123 when it was first mounted).

This provides the advantage of avoiding index creation when a removable storage medium is mounted on a drive of a different file operating system, and thus both reduces resource expenditure on the equipment and also improves user experience by allowing almost instantaneous searches. The index manager module 214 is an example means to achieve this advantage.

Figure 3A:
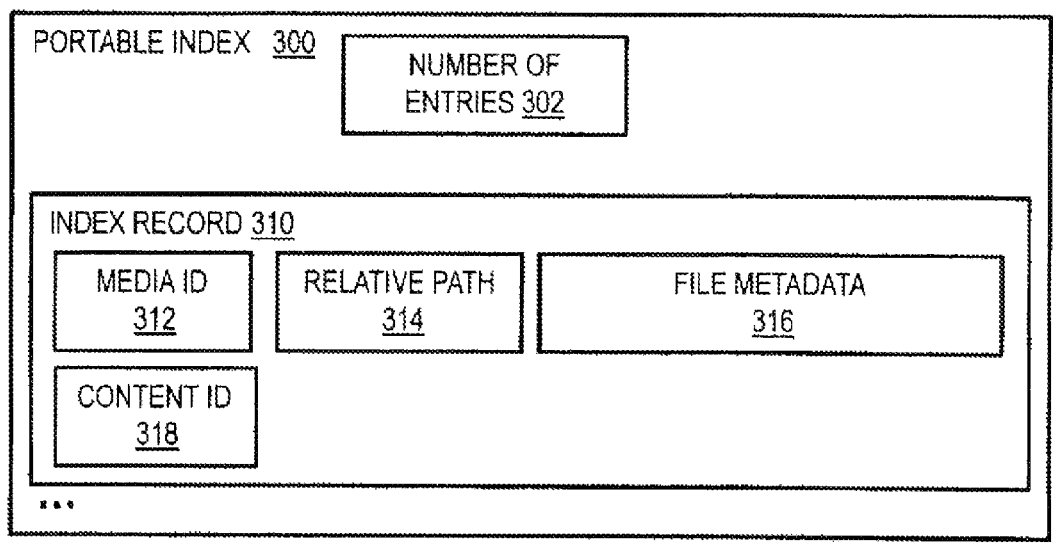
FIG. 3A is a diagram of a portable index data structure on a removable storage medium, according to one embodiment.

FIG. 3A is a diagram of a portable index data structure 300 on a removable storage medium, according to one embodiment. In some embodiments, the data structure is in a portable index file 125 on the removable storage medium 123; and, in some embodiments some or all of the data structure is held in memory as portable index data structure 224. The portable index data structure 300 includes a number of entries field 302 and an index record field 310 for every file on the removable storage medium, as indicated by ellipsis. The number of entries field 302 holds data that indicates a number of index records 210 in the data structure 300. In some embodiments, an end of data structure code is used in a last entry, and field 302 is omitted.

Figure 3B:
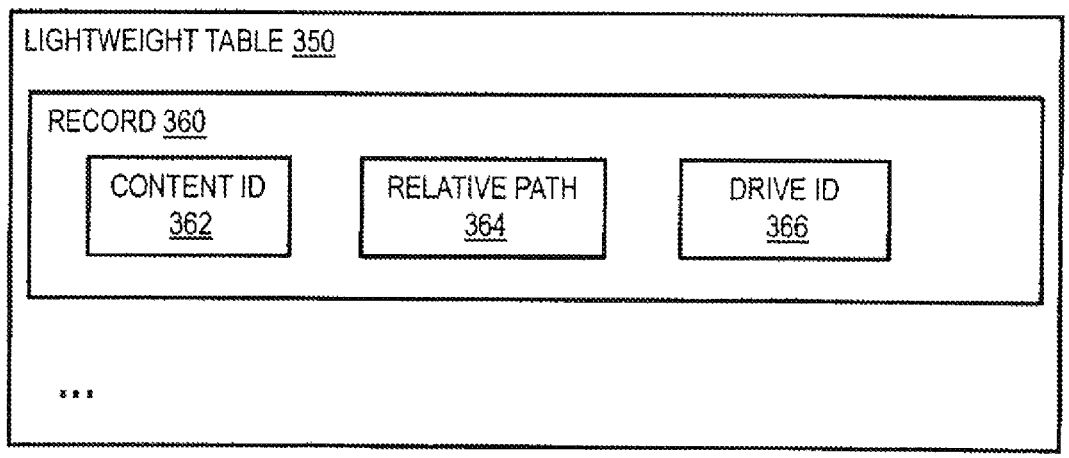
FIG. 3B is a diagram of a lightweight table data structure, according to one embodiment.

Although data structures and fields are depicted in FIG. 3A and FIG. 3B as integral blocks in a particular order for purposes of illustration, in other embodiments, one or more fields or portions thereof are arranged in a different order in one or more data structures, such as one or more databases, or one or more fields or portions thereof are omitted or one or more additional fields are added.

Each index record field 310 holds a media identifier (ID) field 312, a relative path field 314 and a file metadata field 316. In some embodiments, such as in a portable index moved to memory, a content ID field 362 is included in each record as a primary key to identify that record in the portable index. The media ID field 312 holds data that indicates the media ID of the removable storage medium where the file is stored.

The relative path field 314 holds data that indicates a relative path to the file from the root directory on the removable storage medium indicated by the data in the media ID field 312. In some embodiments, the relative path 314 includes the file name and path from root of removable storage medium. For example a file on removable media relative path can be \media\image\Myfamily.jpg so that field 314 represents the whole path including document name from root of removable media drive. In some embodiments, the relative path field also includes a drive letter, such a drive letter of the drive where the removable storage medium was mounted when the file was stored; but the drive letter may be obsolete and is not used for opening the file.

The file metadata field 316 holds metadata harvested from the file, e.g., at the time the file was first stored on the removable storage medium. For example, the file metadata field 316 is an aggregate field that holds data that indicates multiple pairs of values. A first value in each pair indicates a name of a metadata parameter or key word or phrase; and a second value in each pair indicates a value or count associated with the name indicated by the first value. A metadata harvesting process determined what was placed in this field. In some embodiments, multiple different harvesters placed multiple different optimized indexes into this field. One or more of the aggregated indexes can be searched by a search engine or display process on the different device to which the removable storage medium is moved.

It is noted that the media ID in field 312 can be converted to a drive ID by a call to the API of the file operating system module 204, so that an absolute directory path for the file can be constructed by combining the drive ID and the relative path in field 314. Thus, portable index data structure 300 decouples the large index from the removable mounted drive on which files were generated; and provides a way to re-use the index. This provides the advantage of avoiding index creation when a removable storage medium is mounted on a drive of a different file operating system, and thus both reduces resource expenditure on the equipment and also improves user experience by allowing almost instantaneous searches. The portable index data structure 300 is an example means to achieve this advantage.

Thus, a computer-readable storage medium comprises a set of one or more files of content and a portable index data structure configured for an apparatus to provide a portable index. The portable index data structure comprises, for each file of the set, data that indicates a media identifier for the computer-readable storage medium, and a relative directory path for the file, and corresponding metadata for the file.

The content ID field 318 for a portable index moved to memory on the current device (e.g., UE 101b) holds data that indicates a unique number, such as a sequence number, for a document on removable storage medium. The value indicated in the content ID field is provided by the harvester of the content directory manager on the current UE (e.g., UE 101b). The value indicated in this field is also used in the lightweight table (LWT) described next. The LWT and portable index data structure 300 thus are synchronized. At any stage, if LWT is modified (e.g. some document is deleted) the corresponding entries from LWT and from the index record are removed based on the value of the content ID. Effectively, the content ID is kind of primary key for portable index data structure 300. In some embodiments, the portable index on the removable medium includes the content ID field, but the values in that field when first mounted were provided by a possibly different device (e.g., UE 101a) and might be obsolete. Values in this field are reassigned by the current UE (e.g., UE 101b). Even though the portable index is modified by the different user equipment, the values in the file metadata field are not modified, so no re-indexing is needed.

FIG. 3B is a diagram of a lightweight table data structure 350, according to one embodiment. In some embodiments, a portion of the data structure is in a lightweight table (LWT) file 223 on the removable storage medium 123; and, in some embodiments, the entire data structure is held in memory as lightweight table data structure 222. The LWT data structure 350 includes a record field 360 for every file on any storage medium or any removable storage medium mounted on any drive in the equipment, as indicated by ellipsis.

Each record field 360 includes a content identifier (ID) field, a relative path field 364, and a drive identifier (ID) field 366. The content ID field 362 holds data that indicates a convenient handle for each content file, such as a sequence number that is unique for al files encountered by the equipment. The value indicated in this content ID field is also added to the content ID field 318 in the portable index to synchronize the data structures.

The relative path field 314 holds data that indicates a relative path to the file from the root directory on the removable storage medium, such as indicated in field 314 for the same file. In some embodiments, the relative path field also includes a drive letter, such a drive letter of the drive where the removable storage medium was mounted when the file was stored; but the drive letter may be obsolete and is not used for opening the file.

The drive ID field 366 holds data that indicates the actual drive on which is mounted the storage medium where the file is located, whether a fixe internal storage medium or a removable storage medium. This is ascertained when the file operating system module 204 reads the file directory on a removable storage medium or reads a LWT file on the removable storage medium, as described in more detail below.

The LWT data structure 350 is used to avoid re-harvesting a file; because a file in the LWT has already been harvested for metadata and that metadata is already in an index for the storage medium on the drive indicated by the drive ID. Thus the LWT is an example means to provide the advantage of conserving resources on user equipment by not harvesting metadata for a file that appears in the LWT. In some embodiments, the LWT data structure is generated by scanning each storage medium on the equipment using the file operating system module 204, including scanning each removable storage medium as it is mounted on a drive. In some embodiments, the LWT is generated by adding records from an LWT file 223 retrieved from each removable storage medium as it is mounted on a drive. Thus, in some embodiments, a computer-readable storage medium comprises a set of one or more files of content and a data structure configured for an apparatus to provide a portable index. The data structure comprises, for each file of the set, data that indicates a particular drive identifier for a particular drive on which the computer-readable storage medium is most recently mounted, and a relative directory path of the file, and a corresponding unique content identifier for the file.

FIG. 4A-4B are diagrams of a flowchart of a process 400 for supporting a portable index on a removable storage medium, according to one embodiment. In one embodiment, the index manager 214 performs the process 400 and is implemented in, for instance, a chip set including a processor and a memory as shown FIG. 7. Although steps are depicted in FIGS. 4A-4B, and subsequent flow diagram FIG. 5B, as integral operations in a particular order for purposes of illustration, in other embodiments steps, or portions thereof, may be performed in a different order or overlapping in time, performed in series or parallel, or omitted or one or more other steps may be added, or the process may be changed in some combination of ways.

In step 401, the media ID of the removable storage medium in each removable storage medium drive is determined and associated with the corresponding drive ID. It is sufficient to do this once per mounting of the medium on the drive, such as when the removable storage medium is first mounted on the drive. Thus, in response to determining that a removable computer-readable storage medium is recently mounted on a particular drive having a particular drive identifier, a particular media identifier is determined for the removable computer-readable storage medium. For purposes of illustration, it is assumed that in step 401 it is determined that a removable storage medium with media ID MIDXXXXX is mounted on drive F.

In step 403, content files on the removable storage medium are determined Any method may be used to determine this. For example, a content field is downloaded and stored on the removable storage medium by the content delivery system module 230, and this operation is detected by the index manager 214. In some embodiments, step 403 includes using the API of the file operating system module 204 to recursively or sequentially scan the removable storage medium in one of the drives 202 and determine the directories and files in each directory, as is well known in the art.

In step 405 it is determined whether a LWT file is stored on the removable storage medium. In some embodiments, the LWT file is given a predetermined name and stored in a predetermined directory, such as the root directory; and step 405 is determined by checking whether a file of that name is in that directory. In some embodiments, the LWT file is found, if present, by scanning multiple directories to find a file of that predetermined name. If a LWT file is found on the removable storage medium, then, in step 407, the records from the LWT file are added to a current LWT data structure 222 maintained by the index manager 214, but the value in the drive ID field 366 is replaced by the drive ID associated with the removable storage medium where the LWT was found in step 405. For example, if a LWT file is found on the removable storage medium mounted in drive F, then any value in the drive ID field 366 is replaced by data indicating drive F.

If it is determined in step 405 that a LWT file is not stored on the removable storage medium, then in step 409 the LWT is constructed by using the API into the file operating system to scan the file and directory structure of the removable storage medium and return each file with complete directory path. The results of this operation is a list of file names with absolute directory paths, such as: "F:root/music/genreA/tr1.mp3", "F:root/music/genreA/tr2.mp3", "F:root/music/genreA/tr3.mp3", etc. Data indicating the drive letter "F" is placed in the drive ID field 366. The "F:" is removed from the absolute path and data indicating the remainder (e.g., root/music/genreA/tr1.mp3) is placed in the relative path field 364, and data indicating the next sequential numbers (e.g., 1001) is put in the content ID field 362.

Thus, method 400 includes determining a lightweight table that associates the particular drive identifier with a relative directory path of each file of the set of one or more files on the removable computer-readable storage medium. In some embodiments, the lightweight table also associates a unique content identifier with each relative directory path. In step 407, determining the lightweight table further comprises causing a stored lightweight table to be retrieved from the removable computer-readable storage medium, and causing an associated drive identifier field in the stored lightweight table to be updated with the particular drive identifier. In step 409, determining the lightweight table further comprises causing a file directory to be scanned on the removable computer-readable storage medium, and generating the lightweight table by causing to be stored data that associates a relative directory path for each file of the set with the particular drive identifier.

In step 411, it is determined if a portable index file 125 is found on the removable storage medium. In some embodiments, the portable index file 125 is given a predetermined name and stored in a predetermined directory, such as the root directory; and step 411 is determined by checking whether a file of that name is in that directory. In some embodiments, the portable index file is found, if present, by scanning multiple directories to find a file of that predetermined name. If a portable index file is found on the removable storage medium, then in step 413 the index records 310 are retrieved, e.g., put into local memory as portable index data structure 224. If scanning is done to locate the index file, in some embodiments the LWT table is checked and created, as described above with respect to step 409, at the same time to avoid scanning the storage medium more than once. The LWT is not created from the portable index. It is either already on the storage medium and is copied and updated, with new drive number and content ID, or it is created based on the scan. When scanning starts the LWT table is created in memory and refers to the portable index file on the storage medium. If any entry (with a content ID of document) does not exist in LWT, then that record is added to LWT and corresponding index (from content or metadata of file) is created and put in portable index which is on removable media.

Thus before harvesting metadata from each file of a set of one or more files on the removable computer-readable storage medium, it is determined in step 411 whether a portable index file is stored on the removable computer-readable storage medium. The portable index file includes, for each file of the set, data that associates the media identifier and a relative directory path for one file of the set with metadata for the one file. If the portable index file is stored, then an index is caused to be retrieved from the portable index file without harvesting metadata from each file of the set.

If it is determined in step 411 that a portable index file is not stored on the removable storage medium, then in step 415 the portable index is constructed in data structure 224 and written to portable index file 125. Each file on the drive associated with the removable storage medium of the particular media ID (e.g., each file on drive F associated with media ID MIDXXXXX) is opened, metadata is harvested by the appropriate metadata harvester module 212, and the data is stored in a index record 310. For example, data indicating MIDXXXXX is stored in field 312, data indicating "root/music/genreA/tr1.mp3" is stored in field 314, and metadata, such as artist name, recording date, song title etc. is stored in field 316.

In step 421 it is determined if there is a change to a content file. For example, it is determined whether the contents of a document have changed, resulting in a new count for one or more key words of phrases, or a file is deleted, or a new content file is downloaded by the content delivery system, or a value has changed in a metadata field, such as price or release date. If so, then control passes to step 423 to determine whether the file is in the LWT. If the file is in the LWT, it has already been included in an index and does not have to be opened and harvested for metadata and added to the portable index. Thus, if it is determined in step 423 that the file is in the LWT, then in step 425, the LWT is updated as desirable, and in step 427 the index itself is updated, if needed. An example update to the LWT is to delete a file being deleted. An example update to the index is to add counts for the keyword or phrases of new text in a document and subtract counts of keywords and phrases in deleted text. Thus the method 400 further comprising using the lightweight table to determine whether a particular file is already in the portable index file in step 423.

If it is determined in step 423 that the changed field is not in the LWT, then it should be completely harvested and added to an index. In step 431 the file is opened and metadata is extracted. In step 433, the file is added to the LWT, and in step 435, the media ID, relative path and metadata are added to the portable index data structure.

In step 441, it is determined whether the removable storage medium, and associated media ID, mounted on a drive has changed, e.g., by an event notice of a dismount operation or another mount operation. If so, then in step 443, the LWT is cleaned to remove all files with the drive ID of the drive that is reported to have changed medium. Control passes back to step 401 and following, described above to get the new media ID, portable index and lightweight table. In some embodiments, the LWT cleanup step 443 or equivalent is performed in a separate background process, and control passes more directly from a yes branch of step 441 to step 401.

In some embodiments, the LWT cleanup is initiated to ensure that the LWT data structure consumes no more than a preconfigured amount of memory (e.g., about 1% of the main memory). This is done in such embodiments, because if this table grows quite big then it might cause issues in executing other programs on a device with scarce resources, such as a phone. If the table size memory consumption is more than about the preconfigured value then the LWT is written back to storage (removable or non-removable); and the memory consumed by this table is cleaned up completely. At a later point when the harvesting is re triggered, it is determined if the stored version can be brought to memory. In some embodiments, once in a while based on a preconfigured time (e.g., once in a month) the whole index data structure is cleaned and re-indexing is done in background, e.g., when the mobile is kept for charging. In such a context, the in memory LWT data structure is also cleaned and reconstructed when the re-harvesting is done.

If the removable storage medium has not changed, then control passes to step 451 and following, depicted in FIG. 4B, to use the portable index in a search for content. In step 451, it is determined whether a user has initiated a search of content on the equipment. For example, it is determined whether the search engine/UI module 250 has requested an index from the index manager.

If not, then in step 481 it is determined whether the portable index is to be synchronized with the mobile equipment service 114. Any method may be used to determine if conditions are satisfied for synchronization. In some embodiments, synchronization is automatic, whenever the mobile use equipment is within communication with the network after any update to the portable index. In some embodiments, conditions for synchronization are satisfied whenever the mobile use equipment is within communication with the network after the user selects a synchronization icon on a user interface, e.g., an icon presented in a user interface by a remote access client 117. If so, then in step 483, the portable index is to be synchronized with the copy of the index in the portable index data structure 116 in database 115 of mobile equipment service 114. During synchronization the most recent entries in the portable index are incorporated either on the local file 123 or remote data structure 116. Because the portable index refers to the media ID, the index is good no matter what device the media is mounted on.

After synchronization, or if conditions for synchronization are not satisfied, control passes to step 461 to see if conditions for ending support for the portable index have been satisfied. If so, the process ends. Otherwise control passes back to step 421 described above to detect changes to a content file.

If it is determined in step 451 that the user has initiated a search for content, then in step 471, it is determined whether the portable index is for a local device or a different device. For example, some mobile equipment services 114 allow a user to manage one or more devices registered with the service from a remote access client 117 or browser on any communication device such as UE 101*c*. If the user of UE 101*c* indicates that the search is related to UE 101*a*, then the search is not local. As another example, if the search is for any of user's devices 101*a*, 101*b* or 101*c*, then the search is also not entirely local because it involves a different device. If it is determined, in step 471, that the search is not confined to a local device then in step 473 one or more copies of portable indexes from mobile equipment service 114 are retrieved. Control passes to step 473.

After step 473, or if it is determined in step 471 that the search is local, then in step 453, the index manager searches one or more portable indexes and causes the search results to be presented to the user in association with the media ID and relative path. With the portable index data structure 300, extant content search engines associate all the data in the index with each file. Thus providing the portable index data structure to the search engine causes a conventional content search engines to present search results in association with media ID and relative path. For example, through the content search engine/UI, a user requests all songs on the equipment by a particular artist. The search engine requests indices from the index manager module 214 and searches all the indices, including all portable indices, for metadata that indicates the particular artist. Thus, the method 400 further comprises causing the index from the portable index file to be searched to identify a particular file that satisfies a user request for content.

When a file with such metadata is found, the search engine presents data about the content to the user, usually as one or more metadata values, such as song title, artist name, album name and release date. The search engine also associates the file information in the index with the content, including the media ID and relative directory path.

In step 455, the user selection is intercepted and the media ID associated with the user selection is converted to a drive ID. For example, when the user selects one of the search results to render, the search engine passes the file information, including the media ID and relative path, to the content directory manager (CDM) 210, e.g., the index manager 213, to obtain the file. The CDM uses the media ID in the request from the search engine UI module 250 to request the corresponding drive ID from the file operating system module 204. The file operating system module 204 returns the drive ID to the CDM module 210.

If the drive is not local, e.g., if the selected content is for a different device of the user, then control passes to step 477. In step 477, the user is notified that the search result was on a particular media, having a particular media ID, on a particular piece of equipment where that media was last updated and synchronized with the remote access server service 118. Control then passes to step 621, described above to determine if end conditions are satisfied. If it is determined, in step 475, that the drive for the selected content is local, control passes to step 457.

In step 457, the drive ID is added to the relative path to generate the absolute path that is used to retrieve the file. In some embodiments, step 457 includes deleting data that indicates a potentially obsolete drive ID, if any, from the relative path provided by the search engine UI 250. In some embodiments, the CDM 210 opens the file and retrieves data for the content rendering module 240. In some embodiments, the CDM constructs a file open command with the absolute path of the file. Thus, the method 400 further comprising causing the particular file to be opened by combining the particular drive identifier associated with the media identifier from the index and a relative directory path of the particular file from the index.

In step 459 the retrieved file is caused to be forwarded to the content rendering module 240. For example, the CDM 210 sends the file open command to the content rendering module 240, either directly or indirectly through the content search engine/UI module 250. As a consequence, the content rendering module 240 renders the content of the selected file. Control then passes to step 481, described above, to determine whether conditions are satisfied for synchronizing the local portable index, if any, with the mobile equipment service 114.

Figure 5A:
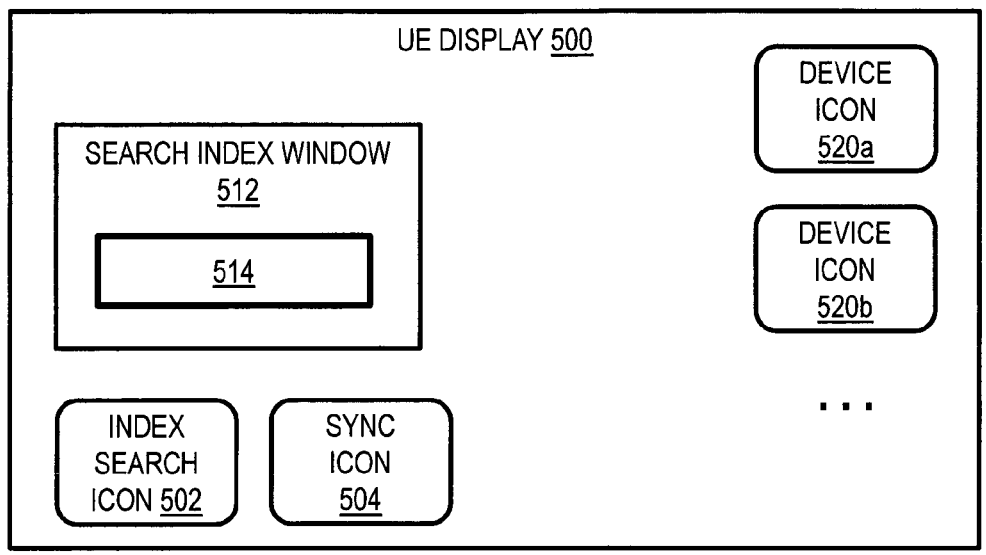
FIG. 5A is a diagram of a user interface for accessing a portable index remotely, according to one embodiment.

FIG. 5A is a diagram of a user interface for accessing a portable index remotely, according to one embodiment. The user interface occupies part or all of a display 500 on user equipment, e.g., UE 101*a*, 101*b* or 101*c*. A UE display 500 includes a two dimensional array of picture elements (pixels). In a user interface one or more portions of the display in a subset of pixels called an icon, are associated with an active area that the user can select using a pointing device, such as a touchscreen to indicate some action associated with the process indicated by the icon, as is well known in the art.

In various embodiments, the user interface includes an index search icon 502 and a sync icon 504. If the index search icon 502 is selected by a user, then a search index window 512 of one or more icons is opened. In the illustrated embodiment, the search index window 512 includes a text entry box icon 514 where text typed by a user is displayed. That text is used to search the indexes available. If the sync icon 504 is selected by a user, then one or more portable indexes for media mounted on the local device are synchronized with the portable index data structures 116 in user database 115. In some embodiments, e.g., on mobile terminals such as depicted in FIG. 8, only icon 502 and icon 504 are included on UE 500.

In some embodiment, e.g., in embodiments in which a browser on UE 101c is communicating with the mobile equipment service 114, one or more device icons, such as device icon 520a, device icon 520b and others indicated by ellipsis (collectively referenced hereinafter as device icons 520), are included on the UE display 500. By selecting a device icon 520, the user is able to configure that device. In some embodiments, the user is also able to search the index on the selected device remotely. In some embodiments, the result of a search is to identify content for a portable index for media that is on one of the devices indicated by device icons 520, so that when a result is displayed, the device icon of the associated device is highlighted, e.g., made large or moved to a first or top position or changed in color. In some embodiments the user is operating device, such as UE 101c connected to a mobile terminal, e.g., UE 101b, and the device icon 520 for that device is highlighted automatically.

Figure 5B:
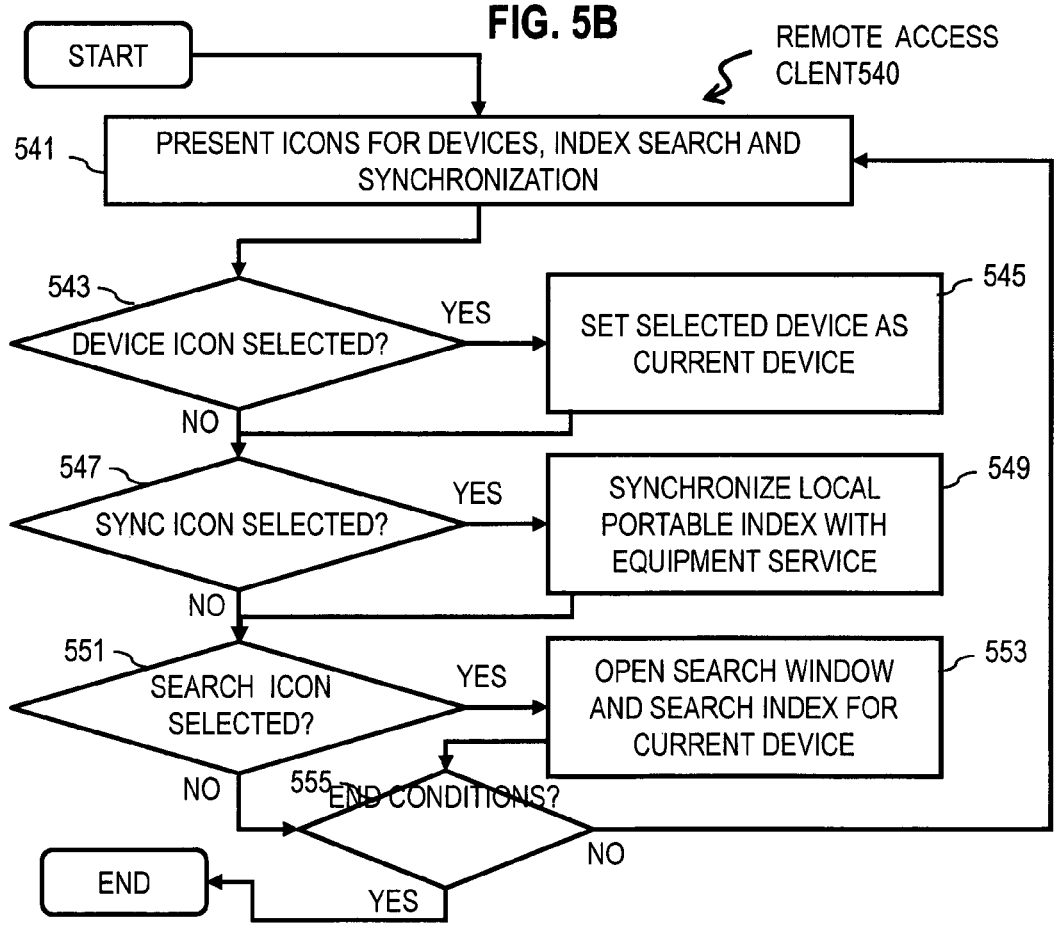
FIG. 5B is a diagram of a flowchart of a process for accessing a portable index remotely, according to one embodiment.

FIG. 5B is a diagram of a flowchart of a process 540 for accessing a portable index remotely, according to one embodiment. In various embodiments a remote access client 117 performs one or more steps of process 540. In step 541, icons are caused to be presented on a user interface portion of a UE display, e.g., UE display 500. The icons include one or more of an index search icon (e.g., icon 502), a synchronization icon (e.g., sync icon 504) or one or more device icons (e.g., icons 520), or some combination.

In step 543, it is determined whether a device icon is selected. If so, then in step 545 the selected device is the current device. In some embodiments two or more device icons may be selected by a user. In some embodiments, e.g., in some embodiments in which the UE 101 is a mobile terminal or a computer to which a single mobile terminal is connected, there are no device icons and the local device is the current device and steps 543 is omitted. Step 545 includes retrieving the local or remote portable indexes associated with the current device or devices, e.g., by exchanging one or more messages with the remote access server 118 over network 105.

In step 547, it is determined whether the sync icon is selected. If so, then in step 549 a portable index on the local device, or a mobile terminal connected to the local device, is synchronized with the portable index data structure, e.g., portable index 224 is synchronized with data structure 116, in the user database 115 of the mobile equipment service 114 by one or more messages exchanged with the remote access server 118 over network 105. In some embodiments, synchronization is not performed and steps 547 and 549 are omitted.

In step 551 it is determined if a search icon is selected. If so, then in step 553 the search window is opened for a search to be conducted of the indexes on the current device, e.g., one or more devices selected during step 545, described above. In some embodiments, the index manager 214 calls the content search engine/UI module 250 with the indexes on the selected devices; and the content search engine/UI module 250 opens the search index window 512.

In step 555, it is determined if end conditions are satisfied. If so the process ends. If not, control passes back to step 541, described above.

In some embodiments, one mobile device, e.g., UE 101a, has a CDM module 121 with remote access client 117 that communicates with the remote access server 118 on mobile equipment service 114 (such as OVI service available from NOKIA CORPORATION™ of Espoo, Finland) A sync process (e.g., step 549) is launched by a mobile device user selecting a sync icon 504. The sync process; synchronizes all user indexes over mobile equipment services 114 on various network nodes (called a service cloud) and the indexes are synchronized and stored in mobile equipment server database 115. These indexes can be stored in user account and attached to a particular device user is using. The user may have multiple devices and can choose to search for content in all registered devices which may or may not be connected currently to network 105.

In some embodiments, a user launches a browser on a desktop machine, e.g., UE 101c, and logs in to the mobile equipment service 114 search service, e.g. remote access server 118. In such embodiments, the user can search device contents on one or more devices registered to the user because these contents are already synchronized with the database 115. Thus, the user can search device contents even though the user does not have access to the particular device (e.g., UE 101a) at the moment.

In some embodiments, the user connects a mobile device (e.g., UE. 101b) to desktop machine (e.g., UE 101c) using local connectivity (e.g., universal serial bus, USB, cable or Bluetooth indicated by dashed line) and opens up mobile equipment service application (e.g. remote access client 117b) on desktop machine (UE 101c). The user still can do a search on indexes that are stored on the connected device (UE 101b) as the indexes are stored on different local drives, whether removable or internal mass storage.

Using the techniques described herein, a portable index is supported that can be used to search content across different operating systems. The advantages include improving search experience, requiring less time to begin search, reduced memory, processing and battery consumption which otherwise would have occurred during re-harvesting metadata from all files and collecting that data into an index. These techniques can be deployed to any existing search and indexing techniques and are generic across all operating systems.

The processes described herein for supporting a portable index on a removable storage medium may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
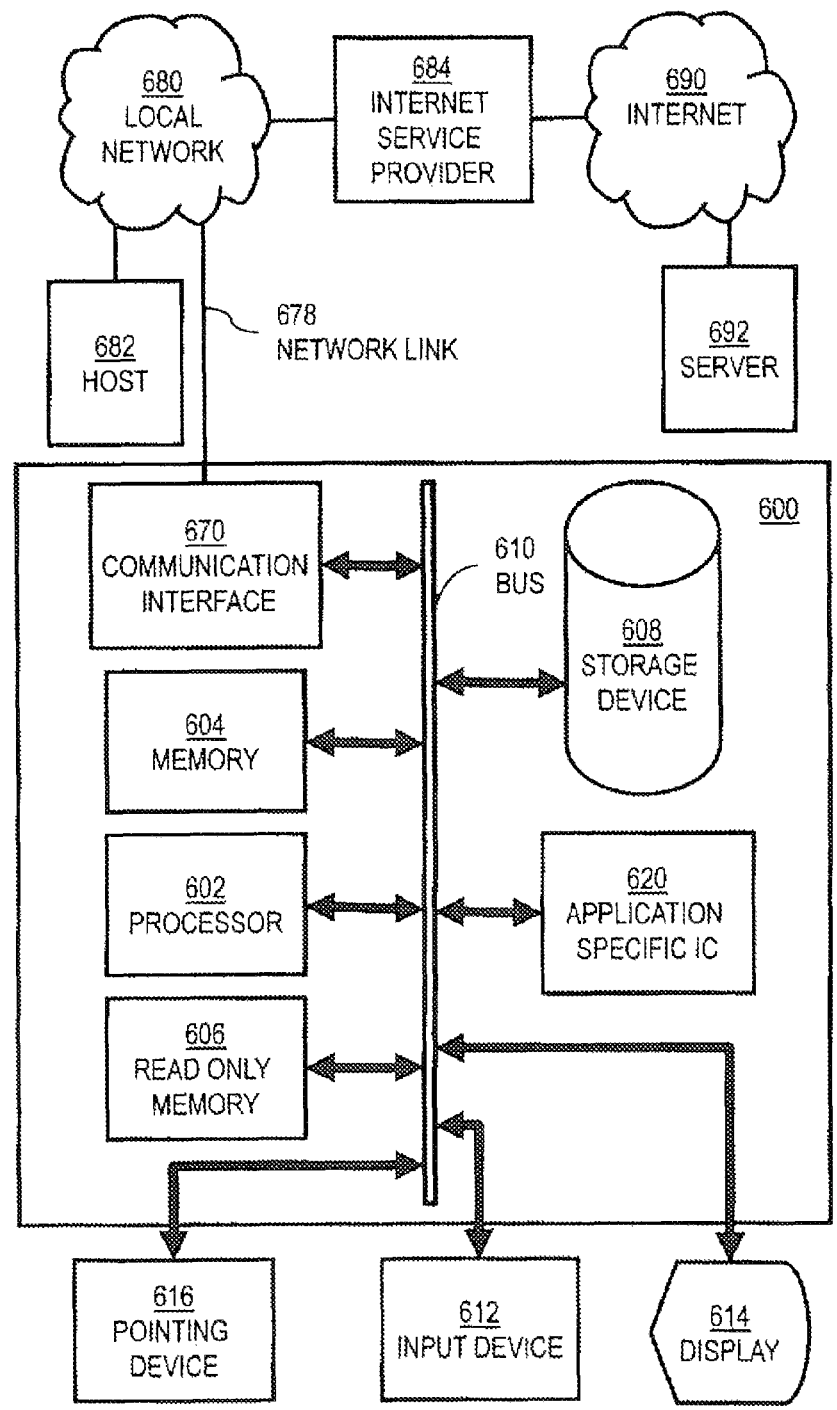
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to support a portable index on a removable storage medium as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of supporting a portable index on a removable storage medium.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to supporting a portable index on a removable storage medium. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for a portable index on a removable storage medium. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for a portable index on a removable storage medium, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for content for a portable index on a removable storage medium to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
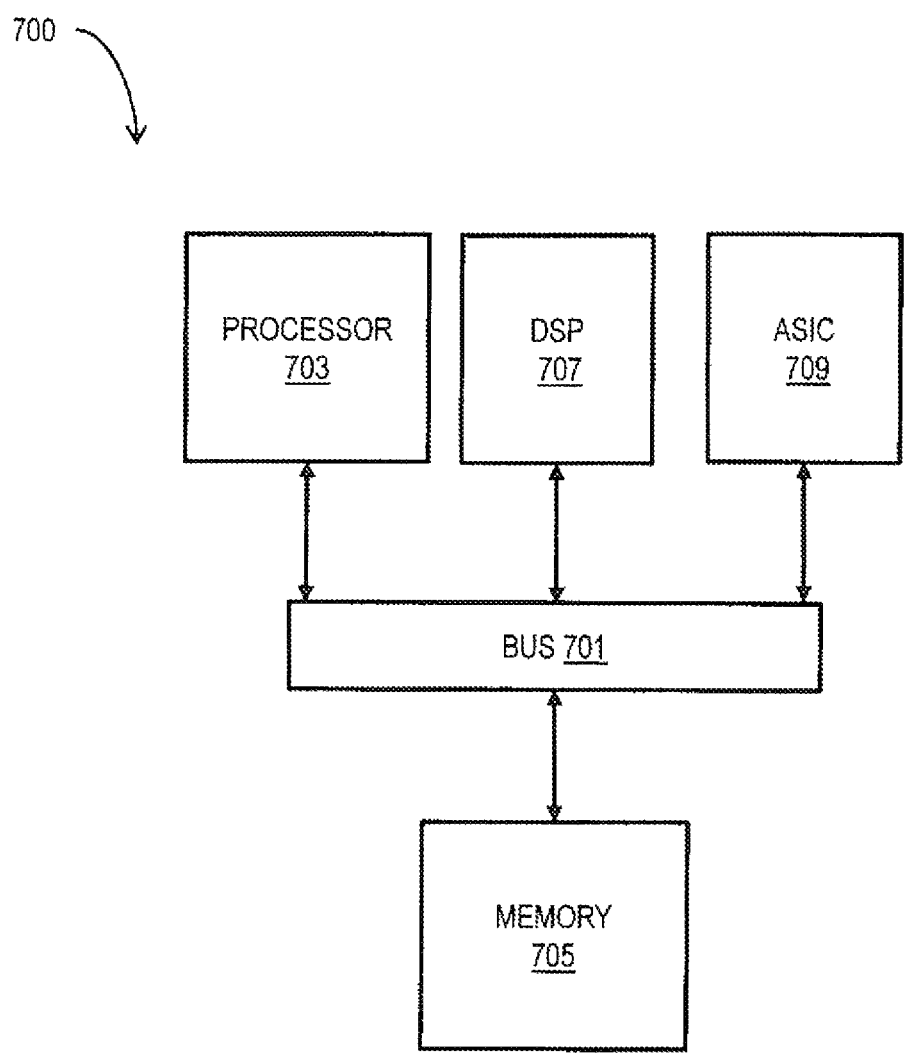
FIG. 7 is a diagram of a chip set that can be used to implement an embodiment of the invention.

FIG. 7 illustrates a chip set or chip 700 upon which an embodiment of the invention may be implemented. Chip set 700 is programmed to support a portable index on a removable storage medium as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps for a portable index on a removable storage medium.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to support a portable index on a removable storage medium. The memory 705 also stores the data associated with or generated by the execution of the inventive steps.

Figure 8:
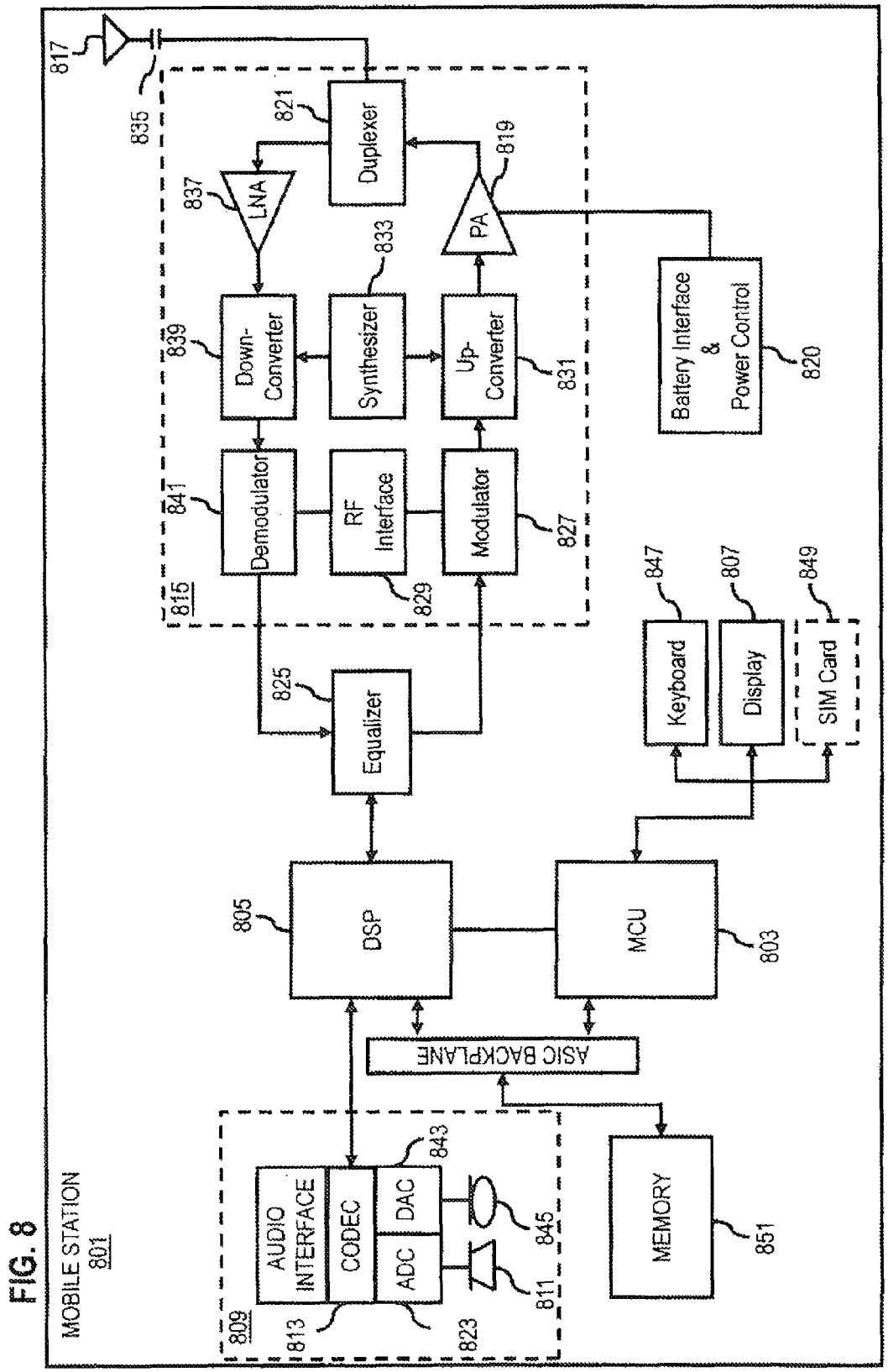
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps for a portable index on a removable storage medium. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of a portable index on a removable storage medium. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to support a portable index on a removable storage medium. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   in response to determining that at least one removable computer-readable storage medium is recently mounted on a particular drive having a particular drive identifier, determining a particular media identifier for the removable computer-readable storage medium and associating the particular media identifier with the particular drive identifier;
   before harvesting metadata from at least one file of a set of one or more files on the at least one removable computer-readable storage medium, determining whether a portable index file is stored on the at least one removable computer-readable storage medium, wherein the portable index file includes, for at least one file of the set, data that associates the media identifier and a relative directory path for at least one file of the set with metadata for the at least one file; and
   determining a lightweight table that associates the particular drive identifier with a relative directory path of each file of the set of one or more files on the removable computer-readable storage medium,
   wherein determining the lightweight table comprises:
      causing a stored lightweight table to be retrieved from the removable computer-readable storage medium; and
      causing an associated drive identifier field in the stored lightweight table to be updated with the particular drive identifier;
   determining, based on the lightweight table, whether a particular file is in the portable index file, and if the particular file is not in the portable index file, harvesting the particular file for metadata; and
   causing at least in part an index to be retrieved from the portable index file.

2. A method of claim 1, further comprising causing the index from the portable index file to be searched to identify a particular file that satisfies a user request for content.

3. A method of claim 2, further comprising causing the particular file to be opened by combining the particular drive identifier associated with the media identifier from the index and a relative directory path of the particular file from the index.

4. A method of claim 1, wherein the lightweight table also associates a unique content identifier with each relative directory path.

5. A method of claim 1, wherein determining the lightweight table further comprises:
   causing a file directory to be scanned on the removable computer-readable storage medium; and
   generating the lightweight table by causing to be stored data that associates a relative directory path for each file of the set with the particular drive identifier.

6. An apparatus comprising:
   at least one processor; and
   at least one memory including computer program code for one or more programs,
   the at least one memory and the computer program code configured to, with the at least one processor, cause the apparatus to perform at least the following,
      in response to determining that a removable computer-readable storage medium is recently mounted on a particular drive having a particular drive identifier, determine a particular media identifier for the removable computer-readable storage medium and associating the particular media identifier with the particular drive identifier;
      before harvesting metadata from each file of a set of one or more files on the removable computer-readable storage medium, determine whether a portable index file is stored on the removable computer-readable storage medium, wherein the portable index file includes, for each file of the set, data that associates the media identifier and a relative directory path for one file of the set with metadata for the one file;

determine a lightweight table that associates the particular drive identifier with a relative directory path of each file of the set of one or more files on the removable computer-readable storage medium, wherein to determine the lightweight table comprises to:
cause a stored lightweight table to be retrieved from the removable computer-readable storage medium; and
cause an associated drive identifier field in the stored lightweight table to be updated with the particular drive identifier;

determine, based on the lightweight table, whether a particular file is in the portable index file, and if the particular file is not in the portable index file, harvesting the particular file for metadata; and cause an index to be retrieved from the portable index file.

7. An apparatus of claim 6, wherein the apparatus is further caused, at least in part, to cause the index from the portable index file to be searched to identify a particular file that satisfies a user request for content.

8. An apparatus of claim 7, wherein the apparatus is further caused, at least in part, to cause the particular file to be opened by combining the particular drive identifier associated with the media identifier from the index and a relative directory path of the particular file from the index.

9. An apparatus of claim 6, wherein the lightweight table also associates a unique content identifier with each relative directory path.

10. An apparatus of claim 6, wherein to determine the lightweight table further comprises to:
cause a file directory to be scanned on the removable computer-readable storage medium; and
generate the lightweight table, including cause to be stored data that associates a relative directory path for each file of the set with the particular drive identifier.

11. An apparatus of claim 6, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

12. A non-transitory computer-readable storage medium carrying one or more sequences of one or more instructions which, when executed by one or more processors, cause an apparatus to at least perform the following steps:

in response to determining that a removable computer-readable storage medium is recently mounted on a particular drive having a particular drive identifier, determine a particular media identifier for the removable computer-readable storage medium and associating the particular media identifier with the particular drive identifier;

before harvesting metadata from each file of a set of one or more files on the removable computer-readable storage medium, determine whether a portable index file is stored on the removable computer-readable storage medium, wherein the portable index file includes, for each file of the set, data that associates the media identifier and a relative directory path for one file of the set with metadata for the one file;

determine a lightweight table that associates the particular drive identifier with a relative directory path of each file of the set of one or more files on the removable computer-readable storage medium;

wherein determining the lightweight table comprises:
causing a stored lightweight table to be retrieved from the removable computer-readable storage medium; and
causing an associated drive identifier field in the stored lightweight table to be updated with the particular drive identifier;

determine, based on the lightweight table, whether a particular file is in the portable index file, and if the particular file is not in the portable index file, harvesting the particular file for metadata; and cause an index to be retrieved from the portable index file.

13. A computer-readable storage medium of claim 12, wherein the apparatus is caused, at least in part, to further cause the index from the portable index file to be searched to identify a particular file that satisfies a user request for content.

* * * * *